US010239617B2

(12) United States Patent
Files et al.

(10) Patent No.: US 10,239,617 B2
(45) Date of Patent: Mar. 26, 2019

(54) OXYGEN BOX FOR A LIMITED MAINTENANCE ACCESS AREA ABOVE A CEILING PANEL OF AN AIRCRAFT CABIN

(71) Applicant: The Boeing Company, Chicago, IL (US)

(72) Inventors: Joe Files, Arlington, WA (US); Adam Arthur Logue, Everett, WA (US); Meiling Chi, Edmonds, WA (US); Steven Ellis Rhynard, Mukilteo, WA (US); Lance Smithson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 736 days.

(21) Appl. No.: 14/851,188

(22) Filed: Sep. 11, 2015

(65) Prior Publication Data
US 2017/0073072 A1 Mar. 16, 2017

(51) Int. Cl.
B64D 11/00 (2006.01)
A62B 25/00 (2006.01)
A62B 18/02 (2006.01)

(52) U.S. Cl.
CPC ............ B64D 11/00 (2013.01); A62B 25/005 (2013.01); A62B 18/02 (2013.01); B64D 2231/025 (2013.01)

(58) Field of Classification Search
CPC ............... B64D 11/00; B64D 2231/00; B64D 2231/025; A62B 18/02; E04B 9/006; E04B 9/18; F21V 21/02; F21V 21/03
USPC ....................................... 248/342, 343, 300
See application file for complete search history.

(56) References Cited

U.S. PATENT DOCUMENTS

| 4,154,237 A | | 5/1979 | Courter | |
|---|---|---|---|---|
| 4,518,179 A | | 5/1985 | Fenner | |
| 4,909,247 A | * | 3/1990 | Terrisse | ............... A62B 25/005 |
| | | | | 128/204.29 |
| 5,301,665 A | * | 4/1994 | Jumpertz | ................. A62B 7/08 |
| | | | | 128/202.26 |

(Continued)

FOREIGN PATENT DOCUMENTS

| CA | 2473123 A1 * | 7/2003 | ........... A62B 25/005 |
|---|---|---|---|
| CA | 2820386 A1 * | 12/2013 | ............... A62B 7/14 |

(Continued)

OTHER PUBLICATIONS

Office Action dated Jul. 26, 2017 in co-pending European Patent Application No. 16 185 497.1.

(Continued)

Primary Examiner — Tien Q Dinh
Assistant Examiner — Aaron M Rodziwicz
(74) Attorney, Agent, or Firm — Joseph M. Rolnicki; Evans & Dixon, L.L.C.

(57) ABSTRACT

An oxygen box is secured in an oxygen box hole through a panel of an aircraft cabin by fasteners that are positioned in an interior volume of the oxygen box and are inserted through holes in a back wall of the oxygen box that are aligned with fastener openings in an exterior bracket positioned behind the panel and behind the oxygen box opening where the fasteners are received by the fastener openings in the exterior bracket and the fasteners removably attach the oxygen box to the exterior bracket.

20 Claims, 16 Drawing Sheets

(56) References Cited

U.S. PATENT DOCUMENTS

| | | | | |
|---|---|---|---|---|
| 6,318,364 B1 * | 11/2001 | Ford | ............... | A62B 25/005 |
| | | | | 128/204.18 |
| 6,336,667 B1 * | 1/2002 | Ford | ............... | B64D 11/00 |
| | | | | 128/206.27 |
| 7,296,572 B2 * | 11/2007 | Pietrantoni | ......... | A62B 25/005 |
| | | | | 128/202.27 |
| 8,820,862 B1 * | 9/2014 | Erickson | ............ | B64D 11/0691 |
| | | | | 312/257.1 |
| 2006/0169283 A1 * | 8/2006 | Schaeffer, Jr. | ........... | A62B 7/14 |
| | | | | 128/205.25 |
| 2013/0074836 A1 * | 3/2013 | Contino | ................ | A62B 18/08 |
| | | | | 128/202.26 |
| 2014/0151422 A1 * | 6/2014 | Schrader | ............... | F17C 13/084 |
| | | | | 224/572 |
| 2016/0090192 A1 * | 3/2016 | Dunn | ................ | B64D 11/0015 |
| | | | | 340/945 |

FOREIGN PATENT DOCUMENTS

| | | | | |
|---|---|---|---|---|
| DE | 3719427 A1 * | 12/1988 | ........... | A62B 25/005 |
| EP | 2857314 A1 * | 4/2015 | ............. | B64D 13/00 |
| EP | 2873882 A1 | 5/2015 | | |
| FR | 2507152 A1 | 12/1982 | | |
| FR | 2886621 A1 * | 12/2006 | ........... | A62B 25/005 |
| WO | 97/43179 A1 | 11/1997 | | |
| WO | WO-0025867 A1 * | 5/2000 | ............... | A62B 7/08 |
| WO | WO-2009087488 A1 * | 7/2009 | ............... | A62B 7/14 |

OTHER PUBLICATIONS

European Search Report dated Nov. 15, 2016 in co-pending European Patent Application No. 16185497.1.

* cited by examiner

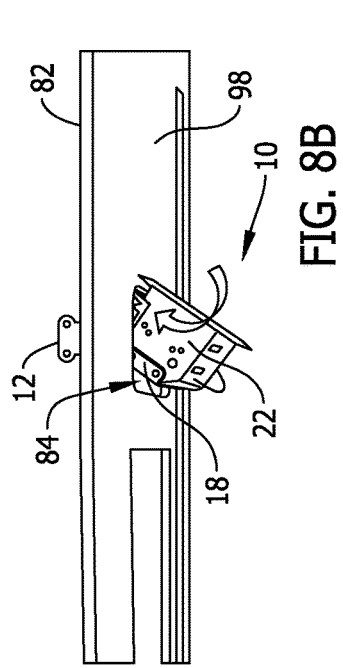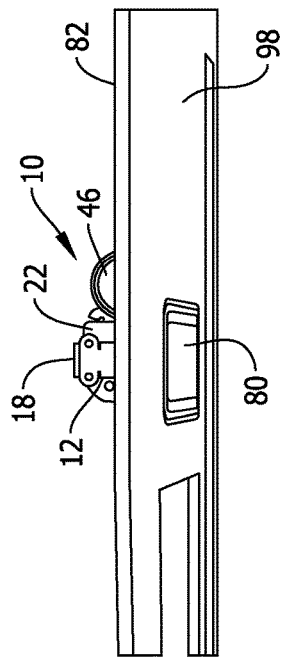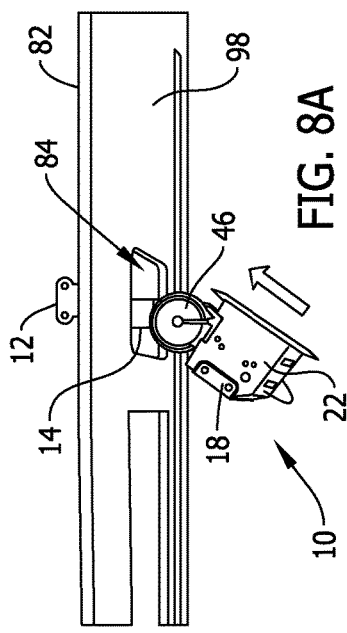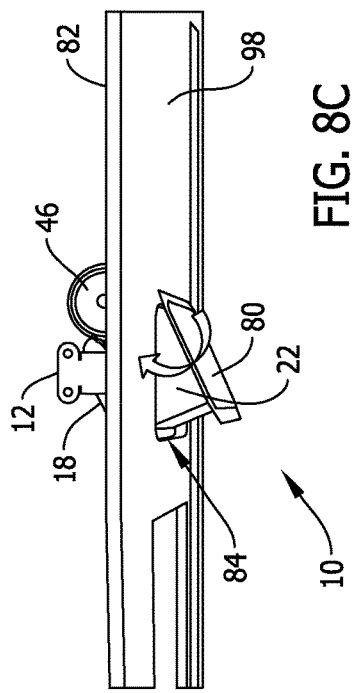

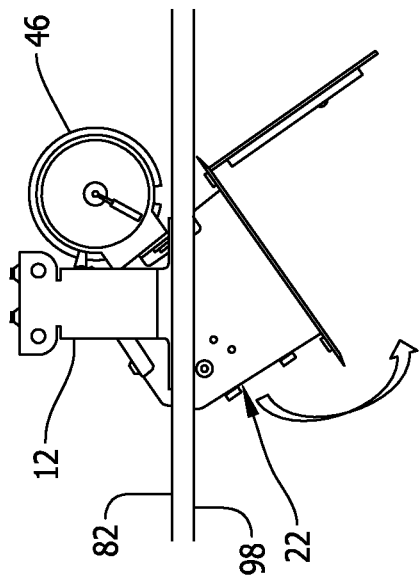
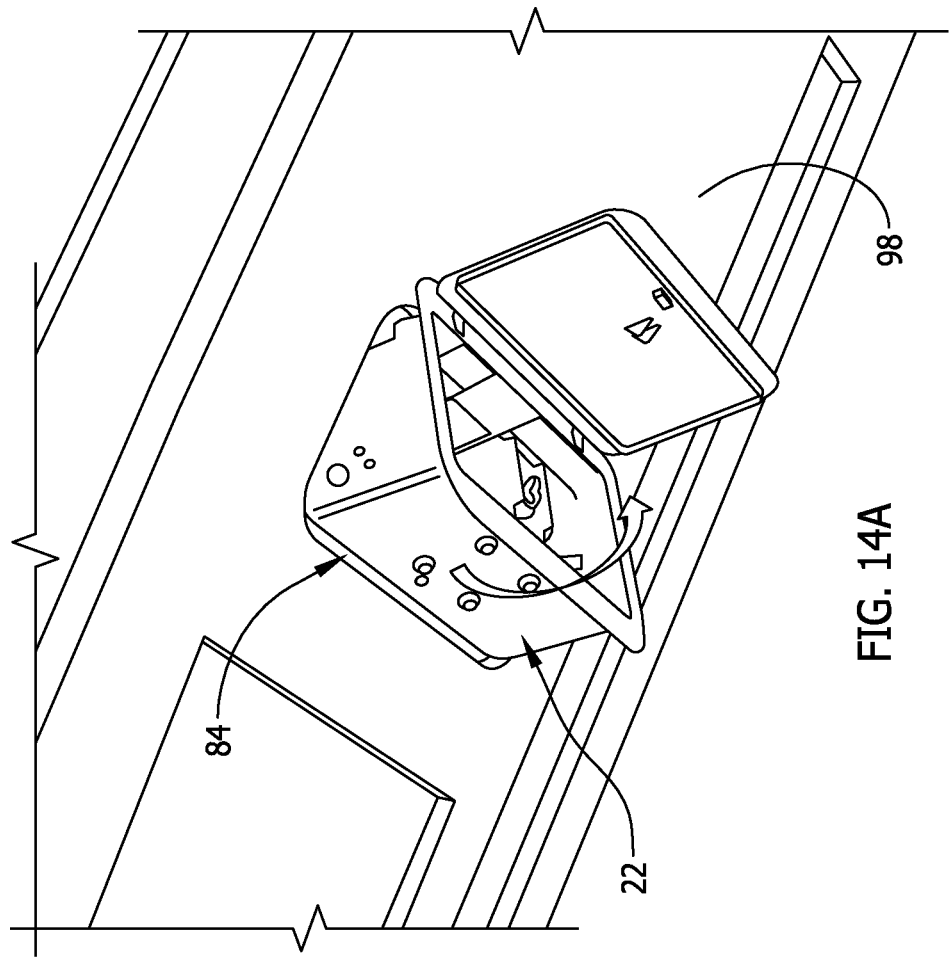
FIG. 14B
FIG. 14A

OXYGEN BOX FOR A LIMITED MAINTENANCE ACCESS AREA ABOVE A CEILING PANEL OF AN AIRCRAFT CABIN

FIELD

This disclosure provides a unique solution for the installation and servicing of oxygen boxes above a ceiling panel of an aircraft cabin where the ceiling panel has been raised to provide a more spacious environment for passengers in the aircraft cabin but negatively limits space above the ceiling panel restricting access for servicing of the oxygen boxes.

BACKGROUND

An oxygen mask is required for each passenger seated in an aircraft cabin. The oxygen mask must be positioned in such a way that, when the mask deploys or drops, the mask is easily visible and reachable by the seated passenger in all possible seat configurations of the aircraft.

In a first class suite of an aircraft, and in particular in a high-walled first class suite where the ceiling of the aircraft cabin is raised, the space above the ceiling is reduced and becomes extremely limited. This is especially true in the outboard seating areas where the ceiling panels of the aircraft cabin merge into the side wall panels. In these areas of the aircraft cabin the space above the ceiling panels is significantly reduced. This area above the ceiling panels is also the primary area where systems such as environmental control systems of the aircraft and support structure of the aircraft are present.

Installing a standard, lowered ceiling oxygen box in the high density areas above raised ceiling panels of an aircraft cabin requires access to the oxygen box from above the ceiling level for maintenance. This would necessitate structural modifications of the aircraft above the ceiling panels and would require rerouting of systems such as the environmental control systems of the aircraft. Such structural modifications and rerouting of systems, even under a best case scenario, would result in a circuitous maintenance access path as well as creating additional constraints for the already tightly packaged environmental control systems and electrical systems above the ceiling panels of the aircraft cabin. Additionally, the oxygen box of a current oxygen box assembly requires access to opposite sides of the box above the ceiling panel for removal and servicing of the oxygen box.

SUMMARY

The oxygen box assembly of this disclosure is basically constructed of first and second support legs, an interior bracket, an exterior bracket, an oxygen box, and fasteners that are used to removably attach the oxygen box in a hole through a ceiling panel of an aircraft cabin. The fasteners that secure the oxygen box in the hole through the ceiling panel are accessible from inside the oxygen box. This enables the oxygen box to be easily removed from the hole through the ceiling panel, inspected and/or serviced, and replaced in the hole through the ceiling panel from the interior of the aircraft cabin. No direct access to the top of the oxygen box or the sides of the oxygen box in the limited space above the ceiling panel of the aircraft cabin is required to remove, inspect, or reinstall the oxygen box in service. The oxygen box assembly eliminates systems and structural design changes that would be required to removably attach current oxygen box configurations in an oxygen box opening of a raised ceiling panel. Additionally, concealing the fasteners in the interior volume of the oxygen box provides a more aesthetic solution to meeting oxygen mask drop requirements in premium architecture areas of the aircraft cabin, such as a first class suite with a raised ceiling as well as in high visibility areas of the aircraft cabin.

The first support leg of the oxygen box assembly is configured to be attached to support structure of the aircraft behind a ceiling panel of the aircraft cabin. The first support leg is positioned adjacent an oxygen box hole in the ceiling panel.

The second support leg is configured as a mirror image of the first support leg. The second support leg is attached to support structure of the aircraft on an opposite side of the oxygen box hole through the ceiling panel from the first support leg.

The exterior bracket is provided with fastener openings that are configured to receive and hold a fastener. The fastener openings are arranged in a specific pattern. The exterior bracket is attached to the first support leg and the second support leg. This positions the exterior bracket above and extending across the oxygen box hole through the ceiling panel of the aircraft cabin.

The oxygen box is configured to be inserted through the oxygen box hole in the ceiling panel of the aircraft. The oxygen box has an interior volume with a back wall and a front opening at opposite sides of the interior volume. The back wall of the oxygen box has holes through the back wall that are dimensioned to enable the fasteners to pass through the holes. With the oxygen box positioned in the oxygen box hole through the ceiling panel, the back wall of the oxygen box is positioned against the exterior bracket behind the ceiling panel. The holes through the back wall of the oxygen box align with the fastener openings of the exterior bracket.

At least one oxygen mask is provided in the interior volume of the oxygen box. However, in most applications there will be more than one oxygen mask in the oxygen box.

A door is also provided on the oxygen box. The door is moveable relative to the oxygen box between a closed position of the door where the door covers over the front opening of the oxygen box and an open position of the door where the door is displaced from the front opening of the oxygen box.

The interior bracket is positioned inside the interior volume of the oxygen box. The interior bracket has holes through the interior bracket. The holes through the interior bracket are arranged in a pattern that corresponds to the pattern of the holes through the back wall of the oxygen box and the pattern of fastener openings in the exterior bracket. The interior bracket is positioned inside the interior volume of the oxygen box and is attached to the back wall of the oxygen box. The holes through the interior bracket align with the holes through the back wall of the oxygen box and the fastener openings of the exterior bracket.

The fasteners are inserted through the interior volume of the oxygen box and through the holes through the interior bracket, the holes through the back wall of the oxygen box and into the fastener openings in the exterior bracket. The fasteners secure the interior bracket, the back wall of the oxygen box and the exterior bracket together and thereby removably secure the oxygen box in the oxygen box hole through the ceiling panel.

The fasteners are accessible from the interior volume of the oxygen box. If it is desired to remove the oxygen box from the oxygen box hole through the ceiling panel, the oxygen box door is opened and the oxygen mask is deployed. This provides access to the fasteners. The fasteners can then be removed from the interior bracket, the back wall of the oxygen box and the exterior bracket to enable removing the oxygen box from the oxygen box hole through the ceiling panel from the interior of the aircraft cabin.

The features, functions and advantages that have been discussed can be achieved independently in various embodiments or may be combined in yet other embodiments, further details of which can be seen with reference to the following description and drawings.

BRIEF DESCRIPTION OF THE DRAWINGS

FIGS. 8A-8D are representations of steps involved in inserting the oxygen box assembly through the oxygen box hole in a ceiling panel of an aircraft cabin.

FIGS. 14A-14B are representations of further steps involved in removing the oxygen box assembly from the oxygen box hole in the ceiling panel of the aircraft cabin.

DESCRIPTION

Figure 1:
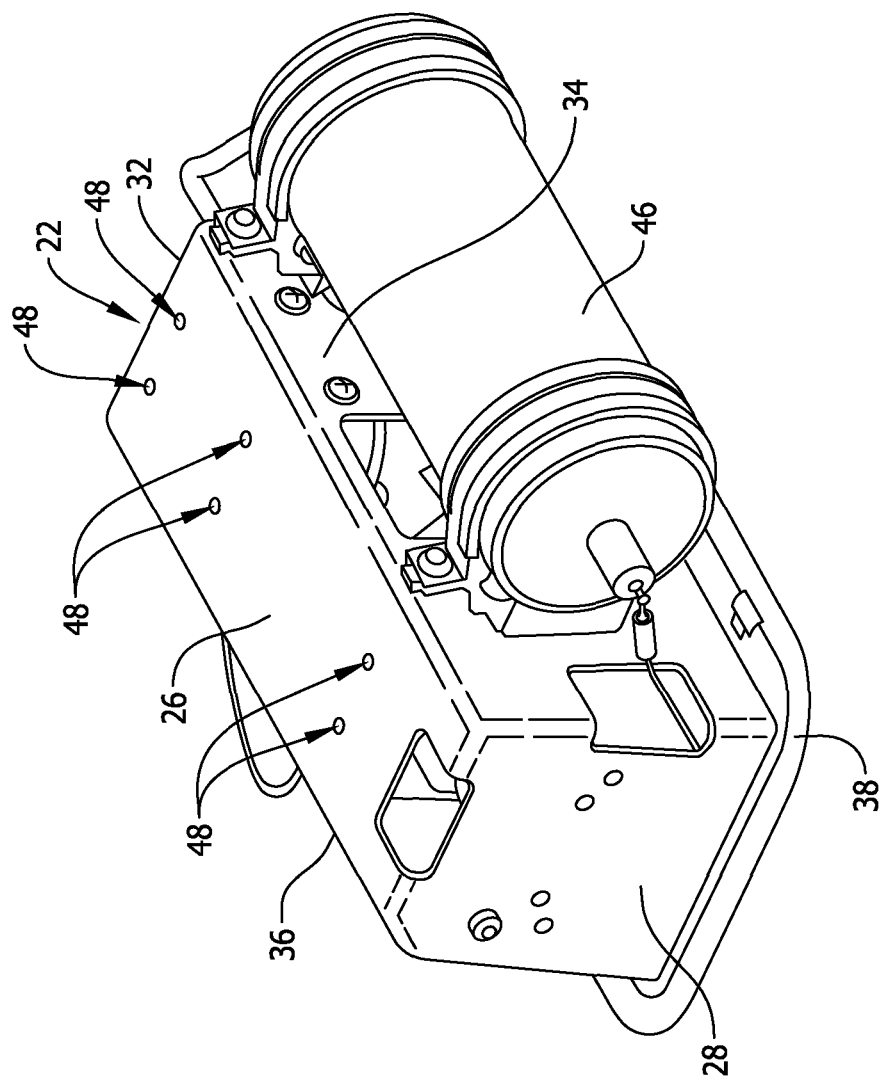
FIG. 1 is a representation of a perspective view of the oxygen box.

As stated earlier, the oxygen box assembly 10 of this disclosure is basically constructed of a first support leg 12, a second support leg 14, an interior bracket 16, and exterior bracket 18, an oxygen box 22 and fasteners 24 that are used to removably attach the oxygen box 22 in an oxygen box hole through a panel of an aircraft cabin. The component parts of the oxygen box assembly 10 listed above can be constructed of any materials typically employed in constructing similar component parts. Additionally, although the oxygen box assembly 10 is described herein as being assembled in an oxygen box hole through a ceiling panel of an aircraft cabin, the oxygen box assembly 10 can be assembled through an oxygen box hole provided through any type of panel or equivalent structure that is used in the construction of the interior surfaces of an aircraft cabin.

Figure 3:
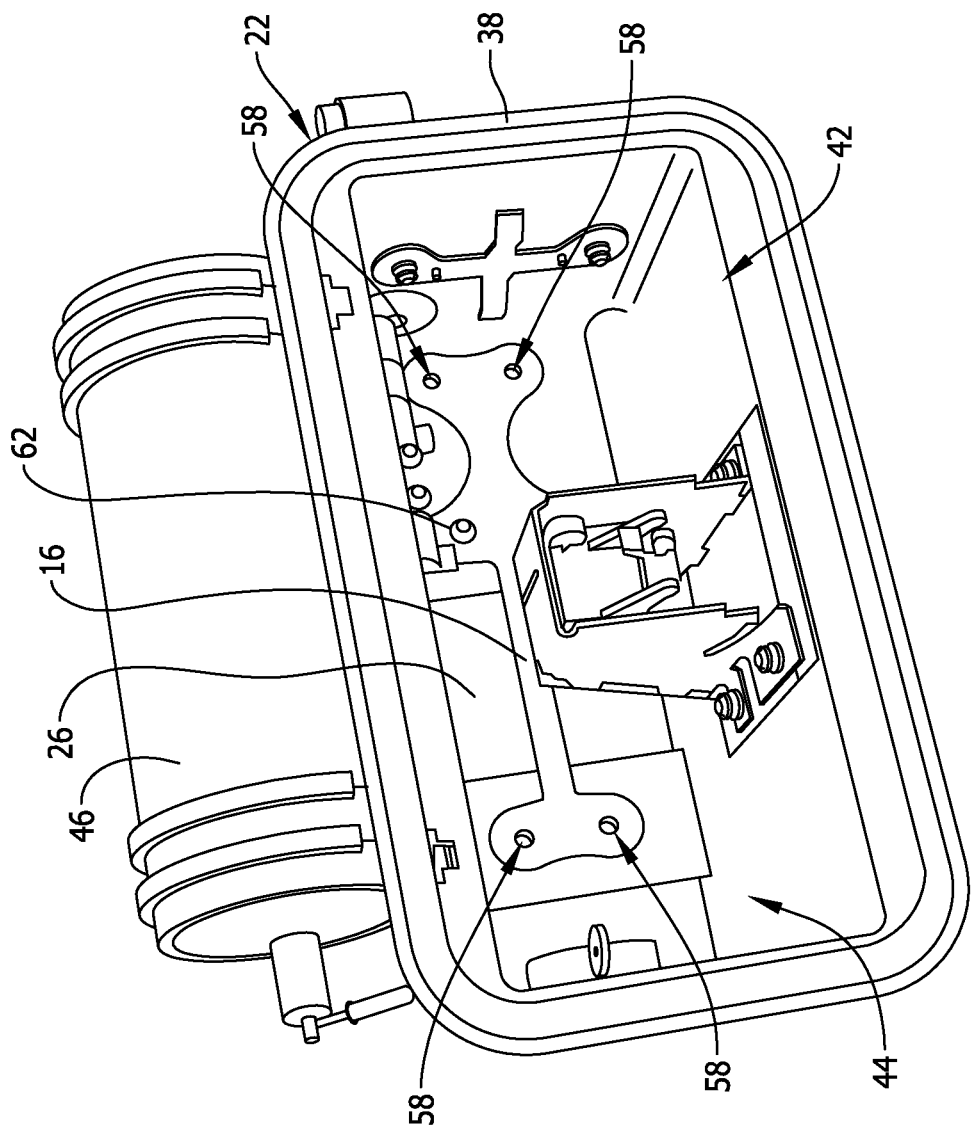
FIG. 3 is a representation of a perspective view of the interior volume of the oxygen box with the interior bracket attached to the back wall of the oxygen box.

FIG. 1 is a representation of a perspective view of the oxygen box 22. The construction of the oxygen box 22 is conventional and includes a back wall 26, opposite end walls 28, 32, opposite side walls 34, 36 and a flange 38 that extends around the end walls 28, 32, the side walls 34, 36 and a front opening 42 of the oxygen box 22. The front open 42 of the oxygen box 22 shown in FIG. 3 provides access to an interior volume 44 of the oxygen box 22 between the back wall 26 and front opening 42. An oxygen canister 46 or other equivalent oxygen generating means is attached to one of the oxygen box side walls 34. The oxygen box 22 includes several holes 48 through the back wall 26. These holes 48 through the back wall 26 are provided for attachment of an oxygen canister or other equivalent oxygen generating means should it be desirable that the canister or means be attached to the back wall 26.

Figure 2:
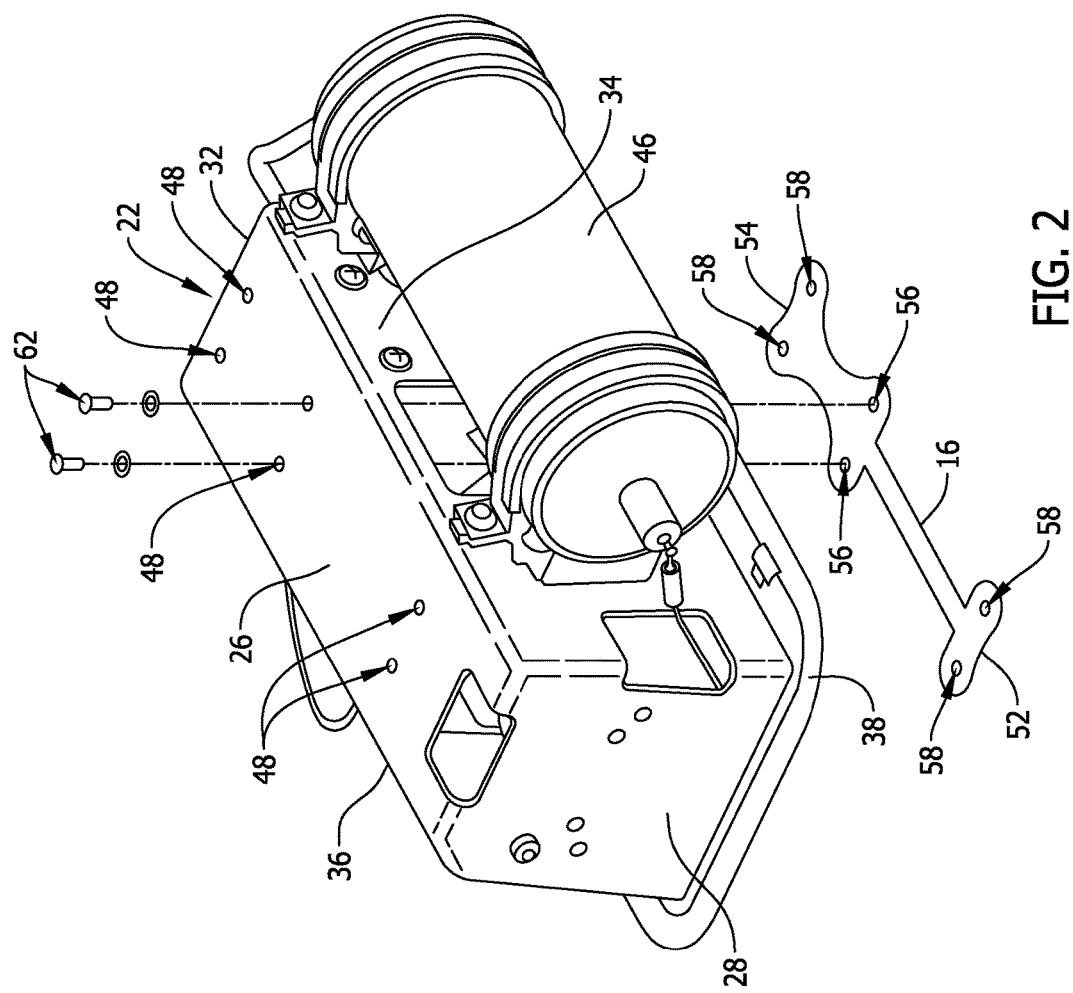
FIG. 2 is a representation of a perspective view of the oxygen box and the interior bracket.

Referring to FIGS. 2 and 3, the interior bracket 16 of the oxygen box assembly is shown. The interior bracket 16 has a length that extends between a first end 52 of the interior bracket 16 and an opposite second end 54 of the interior bracket 16. Holes 56, 58 are provided through the interior bracket 16. The holes 56, 58 are arranged in a pattern that corresponds to the pattern of holes 48 through the back wall 26 of the oxygen box 22. As represented in FIGS. 2 and 3, a pair of fasteners 62 are inserted through a pair of holes 48 in the oxygen box back wall 26 and into the pair of holes 46 in a central portion of the interior bracket 16. As represented in FIG. 3, the interior bracket 16 is positioned in the interior volume 44 of the oxygen box 22 and against the back wall 26 of the oxygen box 22. The interior bracket holes 56, 58 align with the back wall holes 48. The pair of fasteners 62 secure the interior bracket 16 to the back wall 26 of the oxygen box 22. The interior bracket 16 secured to the back wall 26 of the oxygen box 22 reinforces the back wall 26.

In variations of the construction of the oxygen box assembly 10, the interior bracket 16 could be replaced with two or more similar brackets, or could be replaced with washers to reinforce the back wall 26 of the oxygen box 22.

Figure 4:
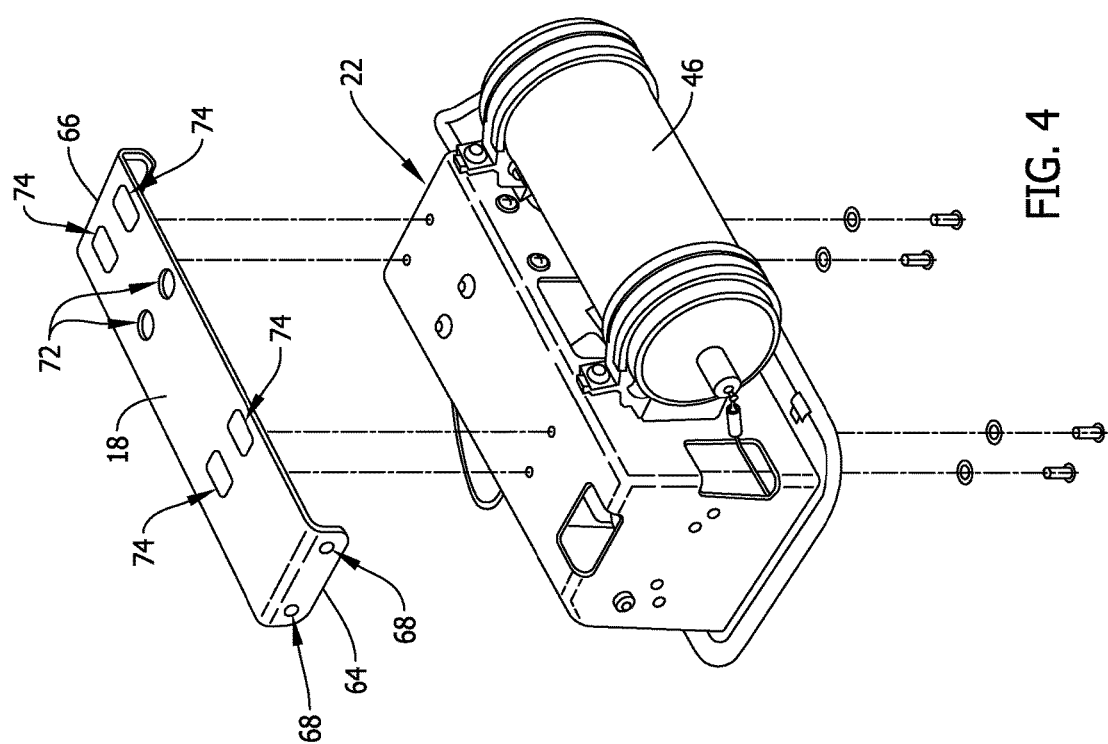
FIG. 4 is a representation of a perspective view of the oxygen box and the exterior bracket.
Figure 5:
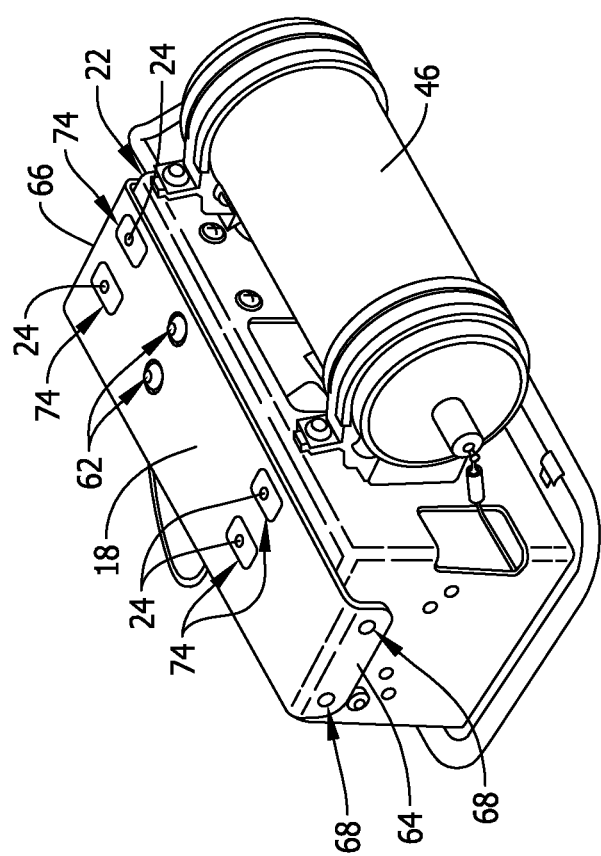
FIG. 5 is a representation of a perspective view of the oxygen box with the exterior bracket attached to the oxygen box.
Figure 6:
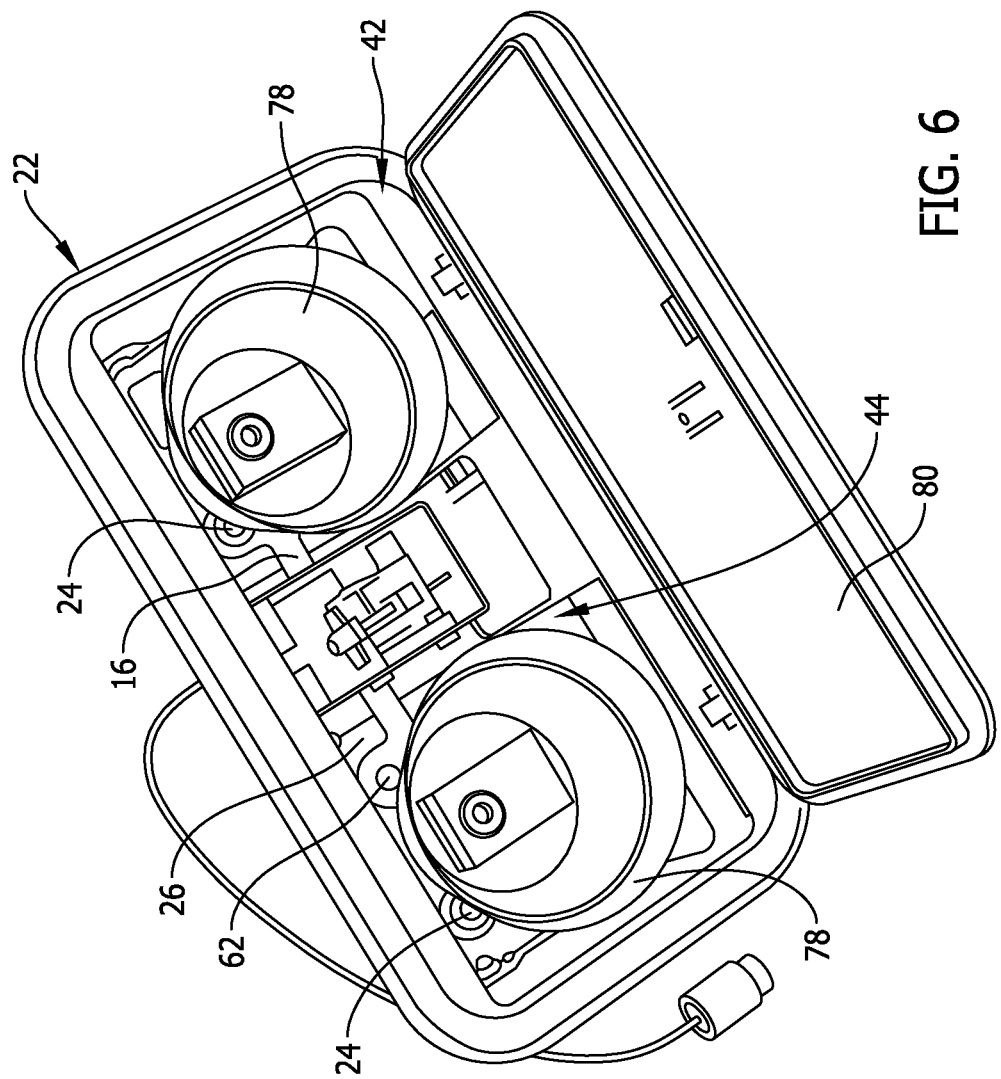
FIG. 6 is a representation of a perspective view of the interior volume of the oxygen box with oxygen masks in the interior volume.

Referring to FIGS. 4 and 5, the exterior bracket 18 of the oxygen box assembly 10 is represented. The exterior bracket 18 has a length that extends between a first end 64 and a second end 66 of the exterior bracket. Support leg fastener holes 68 pass through the exterior bracket 18 adjacent the first end 64 and second end 66 of the exterior bracket. As represented in FIGS. 4 and 5, the exterior bracket 18 is positioned against the back wall 26 of the oxygen box 22 on the opposite side of the back wall from the interior bracket 16. The exterior bracket 18 is provided with a pair of access holes 72. The access holes 72 are positioned to allow the fasteners 62 that secure the interior bracket 16 to the oxygen box back wall 26 in the interior volume 44 of the oxygen box to pass through the access holes 72 when the exterior bracket 16 is positioned against the back wall 26 of the oxygen box 22. The exterior bracket 18 is also provided with four fastener openings 74. The fastener openings 74 are arranged in a pattern on the exterior bracket 18 that corresponds to the pattern of holes 58 in the interior bracket and the pattern of holes 48 in the back wall 26 of the oxygen box 22. The fastener openings 74 are configured to receive and hold fasteners 24 inserted through the fastener openings 74. As represented in FIGS. 5 and 6, four of the fasteners 24 are inserted into the interior volume 44 of the oxygen box 22, through four of the holes 46 through the interior bracket 16, through four of the holes 48 through the oxygen box back wall 26 and into the fastener openings 74 in the exterior bracket 18. The four fasteners 24 further secure the interior bracket 16 in the interior volume 44 of the oxygen box 22 to the back wall 26 of the oxygen box, and secure the exterior bracket 18 to the back wall 26 of the oxygen box 22 on the exterior of the oxygen box.

Also represented in FIG. 6 is a pair of oxygen masks 78 in the interior volume 44 of the oxygen box 22. Also represented in FIG. 6 is a door 80 of the oxygen box. The door 80 is movable relative to the oxygen box 22 between a closed position of the door where the door covers over the front opening 42 of the oxygen box 22, and an open position of the door 80 where the door is displaced from the front opening 42 of the oxygen box 22 as represented in FIG. 6.

Figure 7:
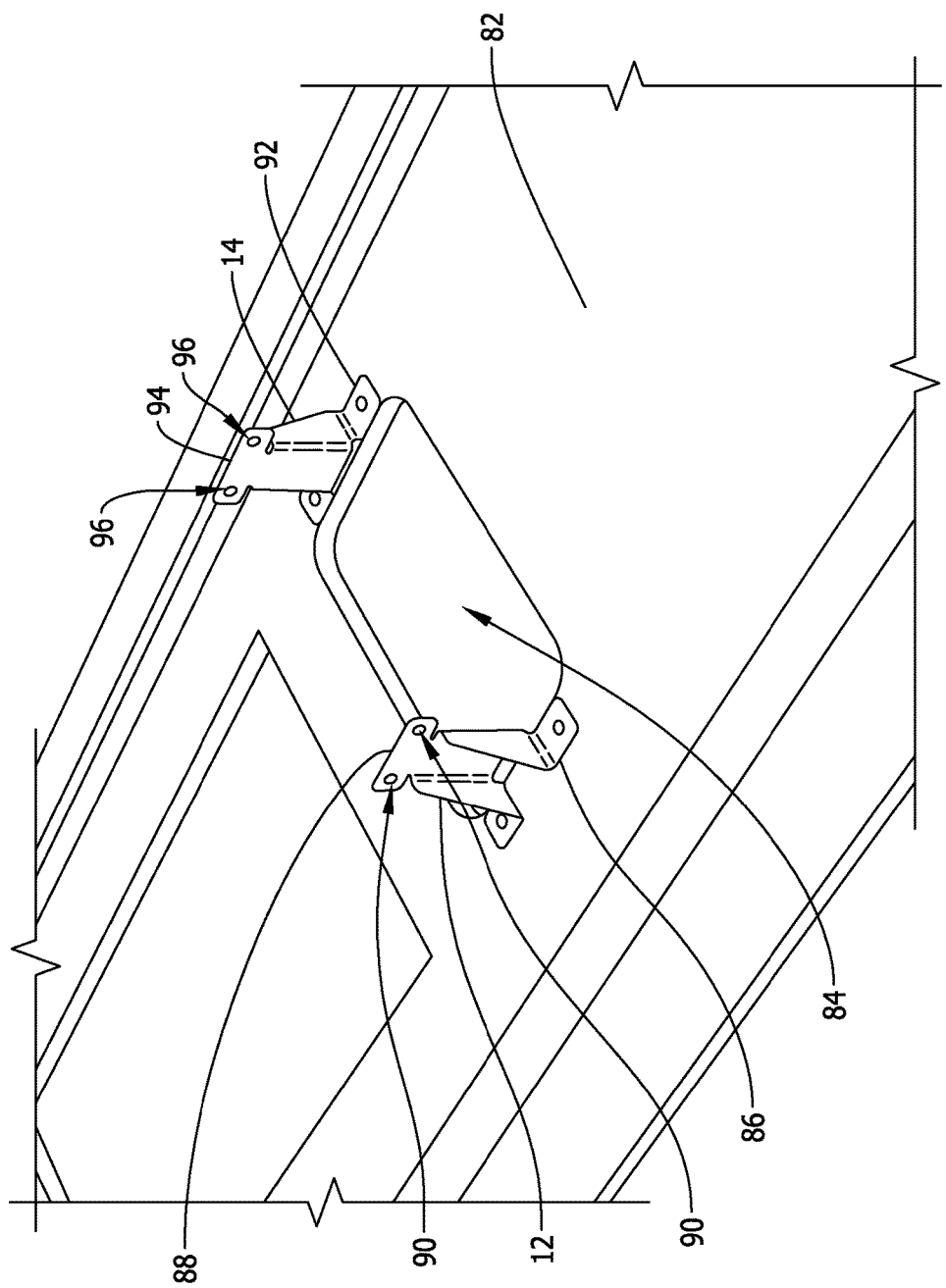
FIG. 7 is a representation of the first and second support legs attached to support structure of an aircraft on opposite sides of an oxygen box hole in a panel of the aircraft cabin.

Referring to FIG. 7, a representation of the first support leg 12 and the second support leg 14 attached to support structure 82 of the aircraft is shown. The support legs 12, 14 are positioned adjacent an oxygen box hole 84 through the support structure 82 of the aircraft. The support structure 82 of the aircraft is shown schematically in FIG. 7. The support structure 82 supports or suspends a ceiling panel of the aircraft cabin on the opposite side of the support structure represented in FIG. 7. The first support leg 12 and second support leg 14 are attached to the support structure 82 during the manufacturing of the aircraft. During the manufacturing process of the aircraft, the support structure 82 is accessible for attachment of the first support leg 12 and the second support leg 14. The first support leg 12 has a length between a bottom end 86 of the first support leg and a top end 88 of the first support leg. The bottom end 86 of the first support leg is configured to be attached to the support structure 82. As represented in FIG. 7, the first support leg 12 is attached to the support structure 82 adjacent one side of the oxygen box hole 84 in the ceiling panel that is positioned on the opposite side of the support structure 82. A pair of fastener holes 90 pass through the first support leg 12 adjacent the top end 88 of the support leg.

The second support leg 14 is configured as a mirror image of the first support leg 12. The second support leg 14 also has a length between a bottom end 92 of the second support leg and a top end 94 of the second support leg. The bottom end 92 of the second support leg is configured to be attached to the support structure 82. As represented in FIG. 7, the second support leg 14 is attached to the support structure 82 adjacent an opposite side of the oxygen box hole 84 from the first support leg 12. A pair of fastener holes 96 pass through the second support leg 14 adjacent the top end 94 of the support leg.

FIGS. 8A-8D represent steps involved in removably attaching the oxygen box assembly 10 in the oxygen box hole 84 in a ceiling panel 98 of an aircraft cabin. In FIGS. 8A-8D, the support structure 82 of the aircraft suspends the ceiling panel 98 below the support structure. The oxygen box assembly 10 is comprised of the oxygen box 22 with the interior bracket 16 assembled to the oxygen box back wall 26 in the interior volume of the oxygen box, and the exterior bracket 18 assembled to the oxygen box back wall 26 on the exterior of the oxygen box 22. The interior volume 44 of the oxygen box 22 contains one or more oxygen masks 78 and the front opening 42 of the oxygen box is closed by the door 80. As represented in FIG. 8A, the oxygen box 22 is moved toward the oxygen box hole 84 with the oxygen canister 46 being first moved through the oxygen box hole 84. As represented in FIG. 8B, once the canister 46 passes through the oxygen box hole 84, the oxygen box 22 is rotated toward the oxygen box hole 44. As represented in FIG. 8C, rotation of the oxygen box 22 through the oxygen box hole 84 is continued until the flange 38 of the oxygen box 22 engages against the ceiling panel 98 as represented in FIG. 8D.

Figure 9:
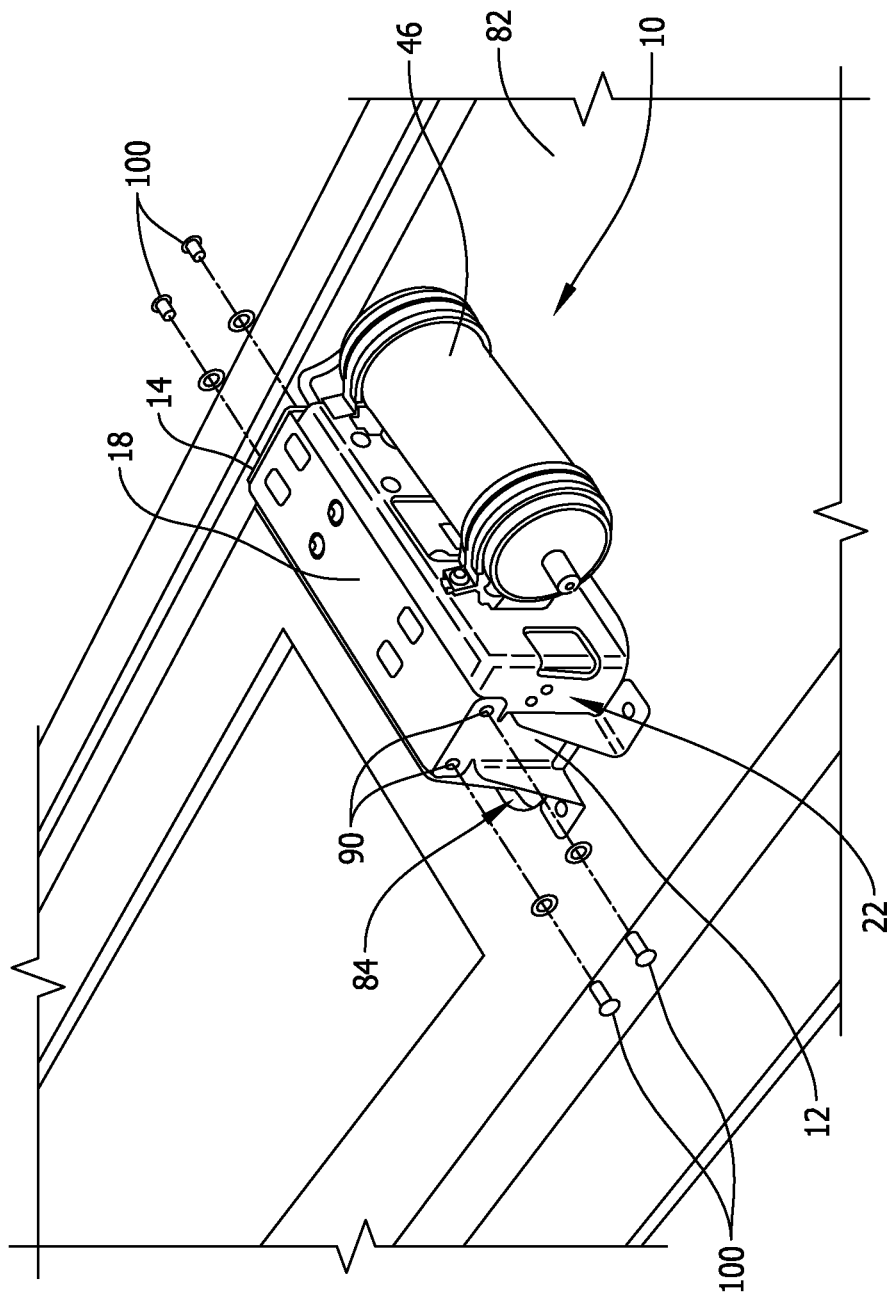
FIG. 9 is a representation of the oxygen box assembly positioned in the oxygen box hole through the ceiling panel of an aircraft cabin in assembling the oxygen box assembly to support structure of the aircraft.

Referring to FIG. 9, fasteners 100 are then inserted through the first support leg fasteners holes 90 and second support leg fastener holes 96 and into the support leg fastener holes 76 of the exterior bracket 18. This attaches the exterior bracket 18 to the support legs 12, 14. This also secures the oxygen box 22 to the ceiling panel 98 in the oxygen box hole 84.

Figure 10:
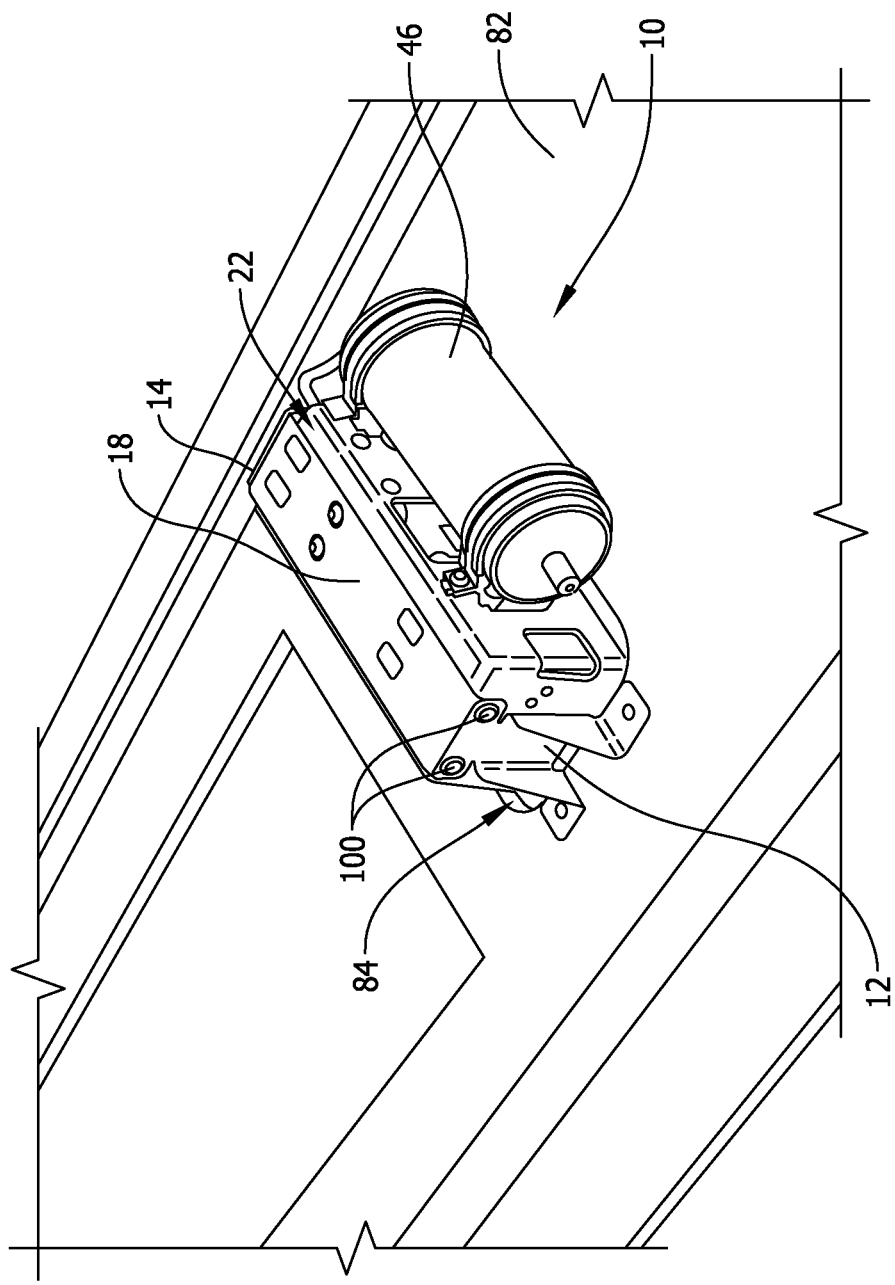
FIG. 10 is a representation of the oxygen box assembly removably attached to the support structure of the aircraft.

FIG. 10 shows the oxygen box 22 secured to the ceiling panel 98 in the oxygen box hole 84. It should be understood that the steps described above in securing the oxygen box 22 to the ceiling panel 98 in the oxygen box hole 84 take place during the manufacture of the aircraft where the space above the aircraft support structure 82 that suspends the ceiling panel 98 is accessible. Once manufacture of the aircraft is complete, there is no access or limited access to the area above the support structure 82.

Figure 11:
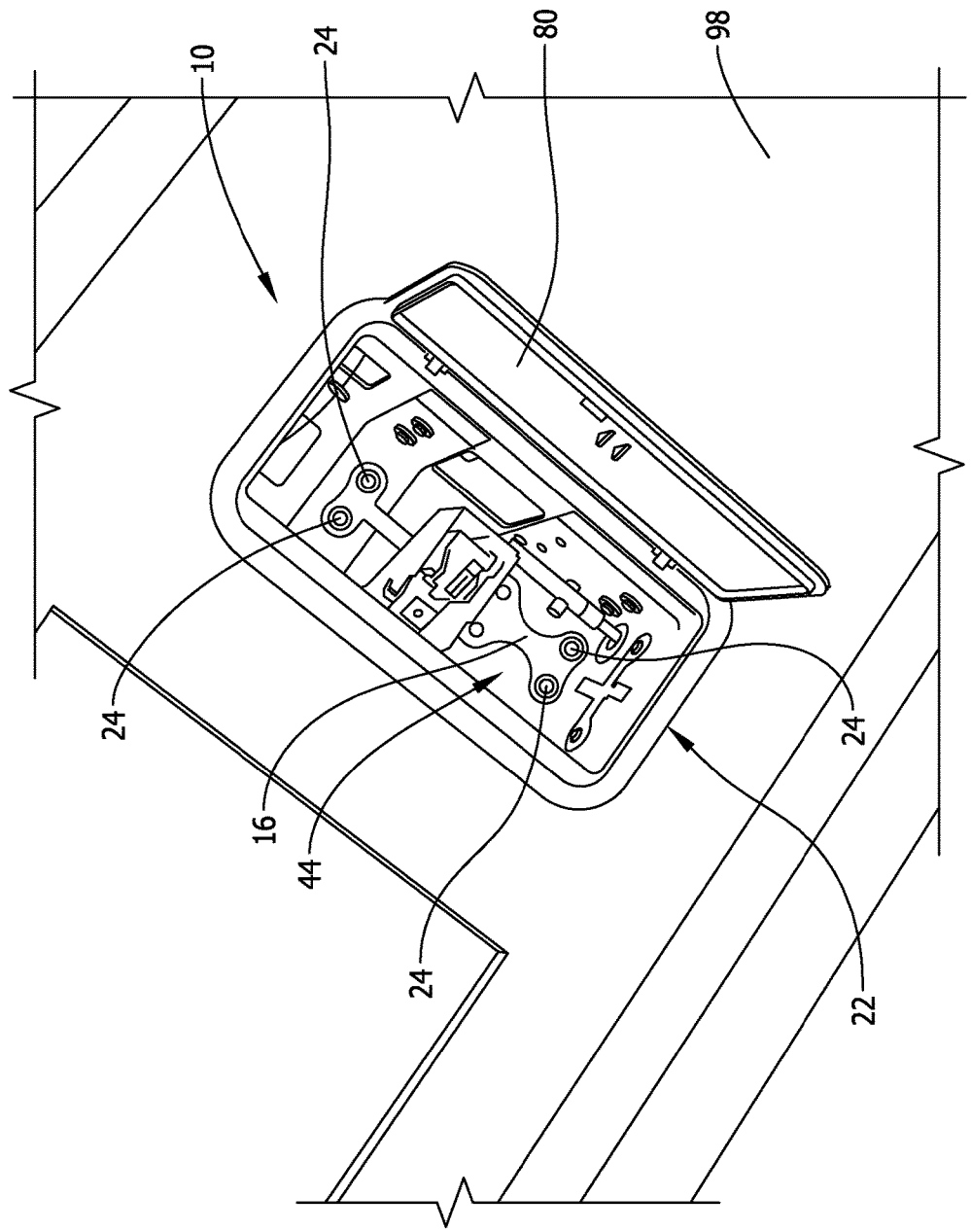
FIG. 11 is a representation of the oxygen box assembly removably secured in the oxygen box hole in the ceiling panel of an aircraft with the oxygen box door opened, the internal volume of the oxygen box exposed and the oxygen masks removed from the oxygen box.

FIG. 11 represents an initial step in removing the oxygen box 22 from the ceiling panel 98 after construction of the aircraft is complete. In FIG. 11 the door 80 of the oxygen box 22 is opened from the interior of the aircraft cabin. The oxygen mask or oxygen masks 78 in the oxygen box 22 are then deployed to provide access to the interior volume 44 of the oxygen box 22. This also provides access to the interior bracket 16 and the fasteners 24 securing the interior bracket 16 and the oxygen box 22 to the exterior bracket 18 that is positioned in the no access or limited access area above the ceiling panel 98 and the support structure 82 of the aircraft.

Figure 12:
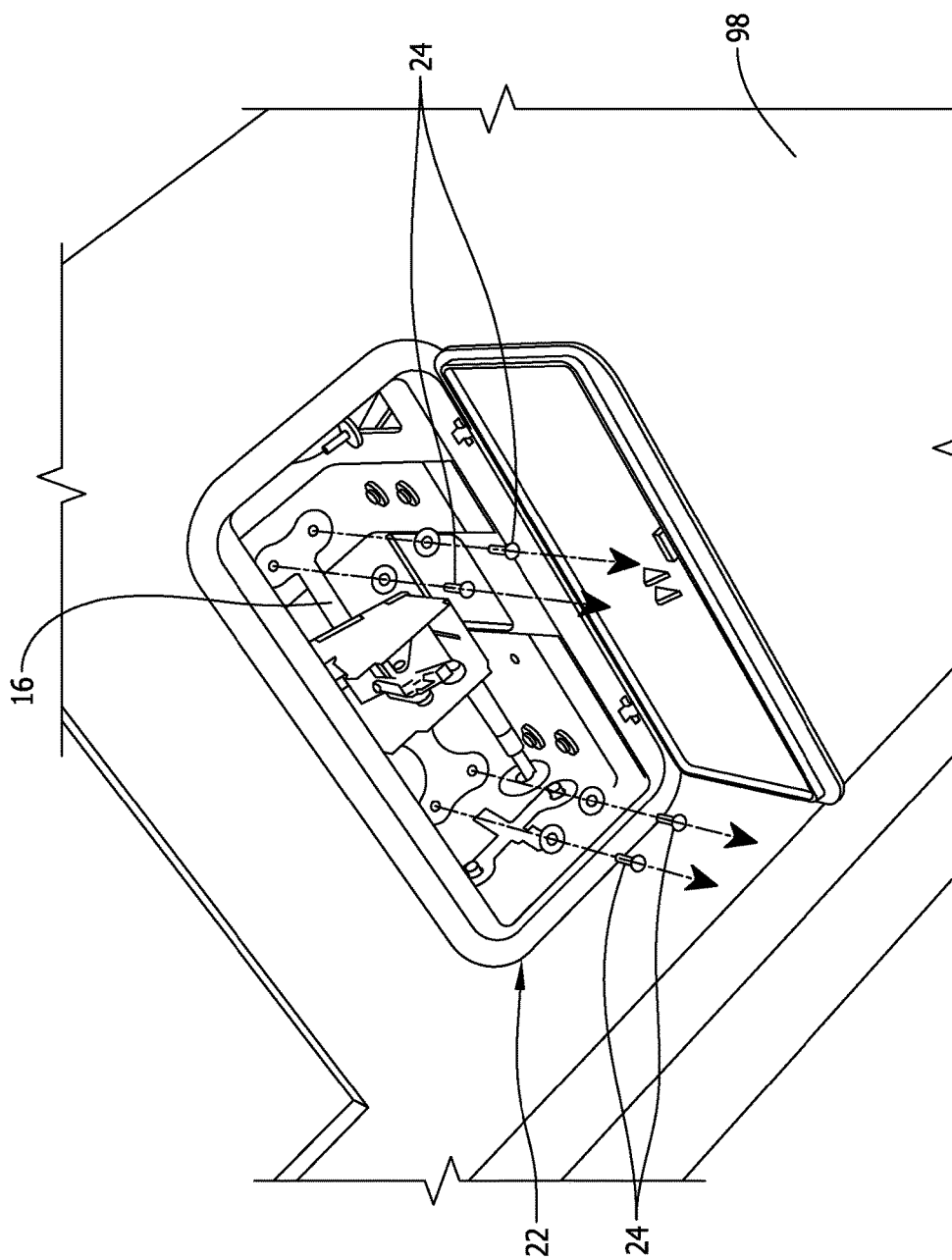
FIG. 12 is a representation of a perspective view of the steps of removing the fasteners from the oxygen box assembly in preparation for removing the oxygen box assembly from the oxygen box hole through the ceiling panel of the aircraft cabin.

As represented in FIG. 12, the fasteners 24 securing the interior bracket 16 and the oxygen box 22 to the exterior bracket 18 are removed. With the fasteners 24 removed, the oxygen box 22 can then be removed from the oxygen box hole 84 in the ceiling panel 98 from the interior of the aircraft cabin.

Figure 13B:
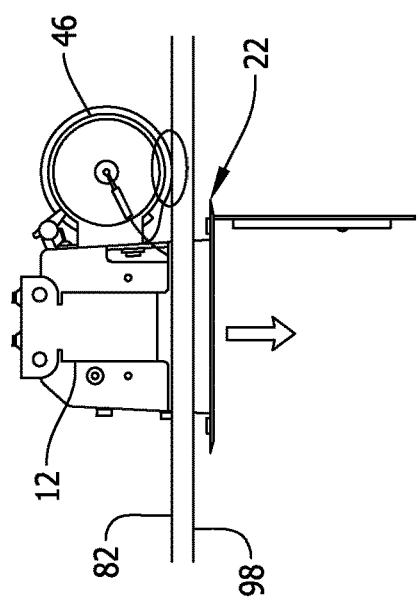
FIGS. 13A-13B are representations of steps involved in removing the oxygen box assembly from the oxygen box hole through the ceiling panel of the aircraft cabin.
Figure 13A:
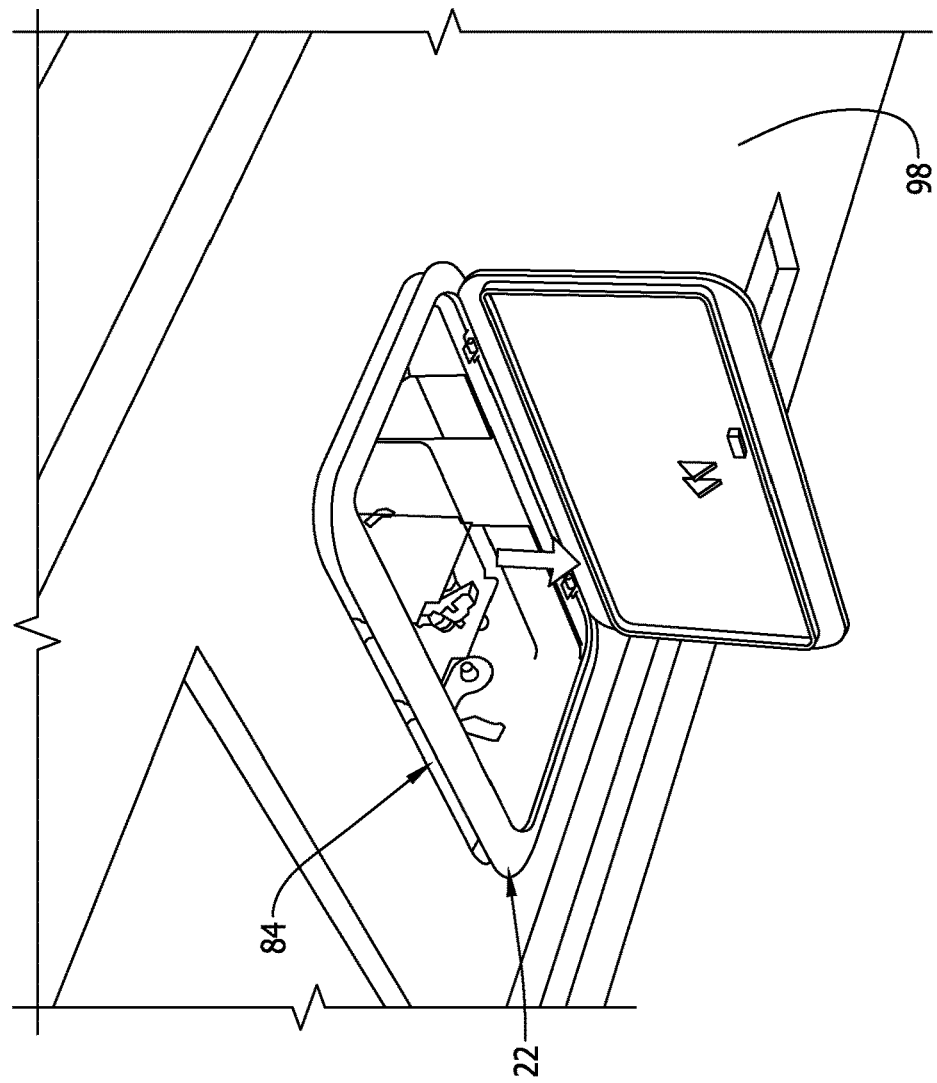

FIGS. 13A and 13B represent initial steps in removing the oxygen box 22 from the oxygen box hole 84 in the ceiling panel 98. The oxygen box 22 is first moved downwardly until the oxygen canister 46 contacts the support structure 82 suspending the ceiling panel 98.

Referring to FIGS. 14A and 14B, the oxygen box 22 is then rotated in the oxygen box hole 84. This causes the oxygen canister 46 to move from engagement against the support structure 82 toward the oxygen box hole 84.

Figure 15B:
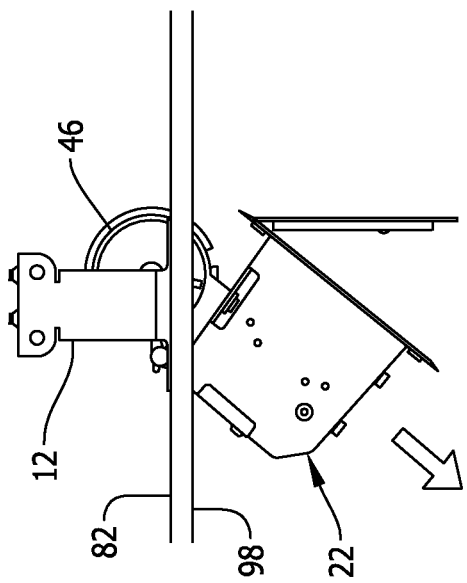
FIGS. 15A-15B represent still further steps involved in removing the oxygen box assembly from the oxygen box hole through the ceiling panel of the aircraft cabin.
Figure 15A:
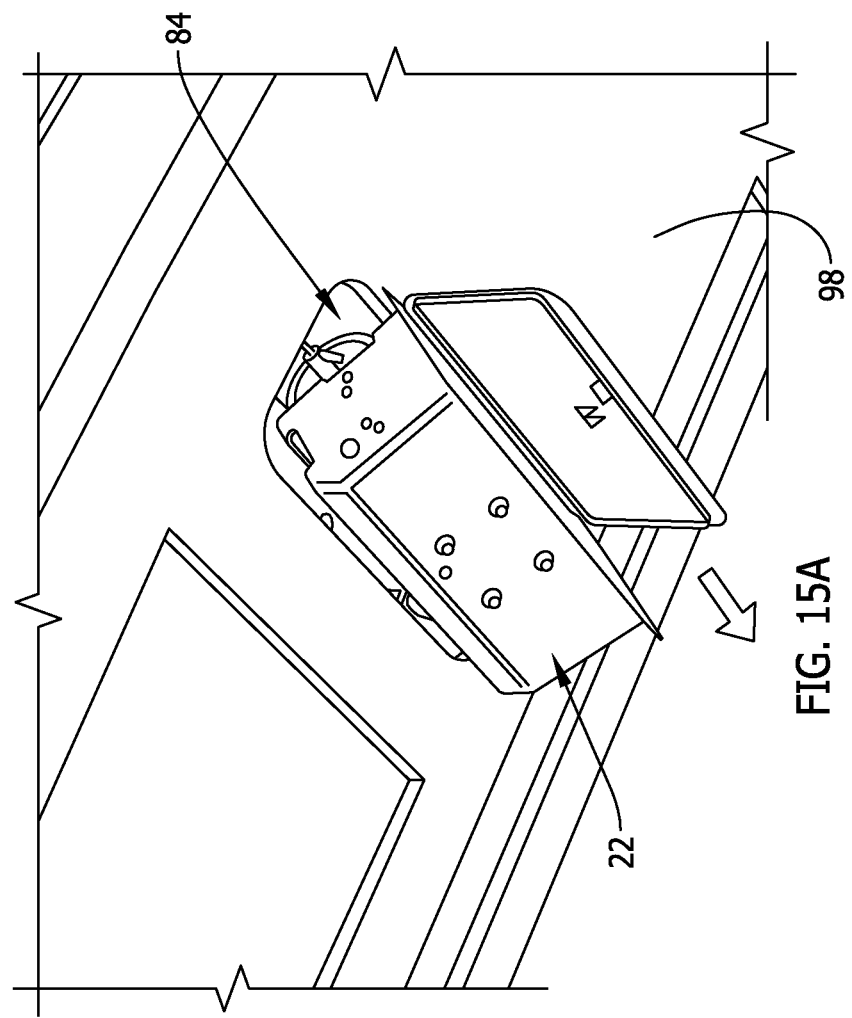

As represented in FIGS. 15A and 15B, when the oxygen box 22 is rotated a sufficient amount until the oxygen canister 46 is positioned above the oxygen box hole 84, the oxygen box 22 and the oxygen canister 46 can then be moved downwardly through the oxygen box hole 84 and out of the oxygen box hole 84.

Figure 16:
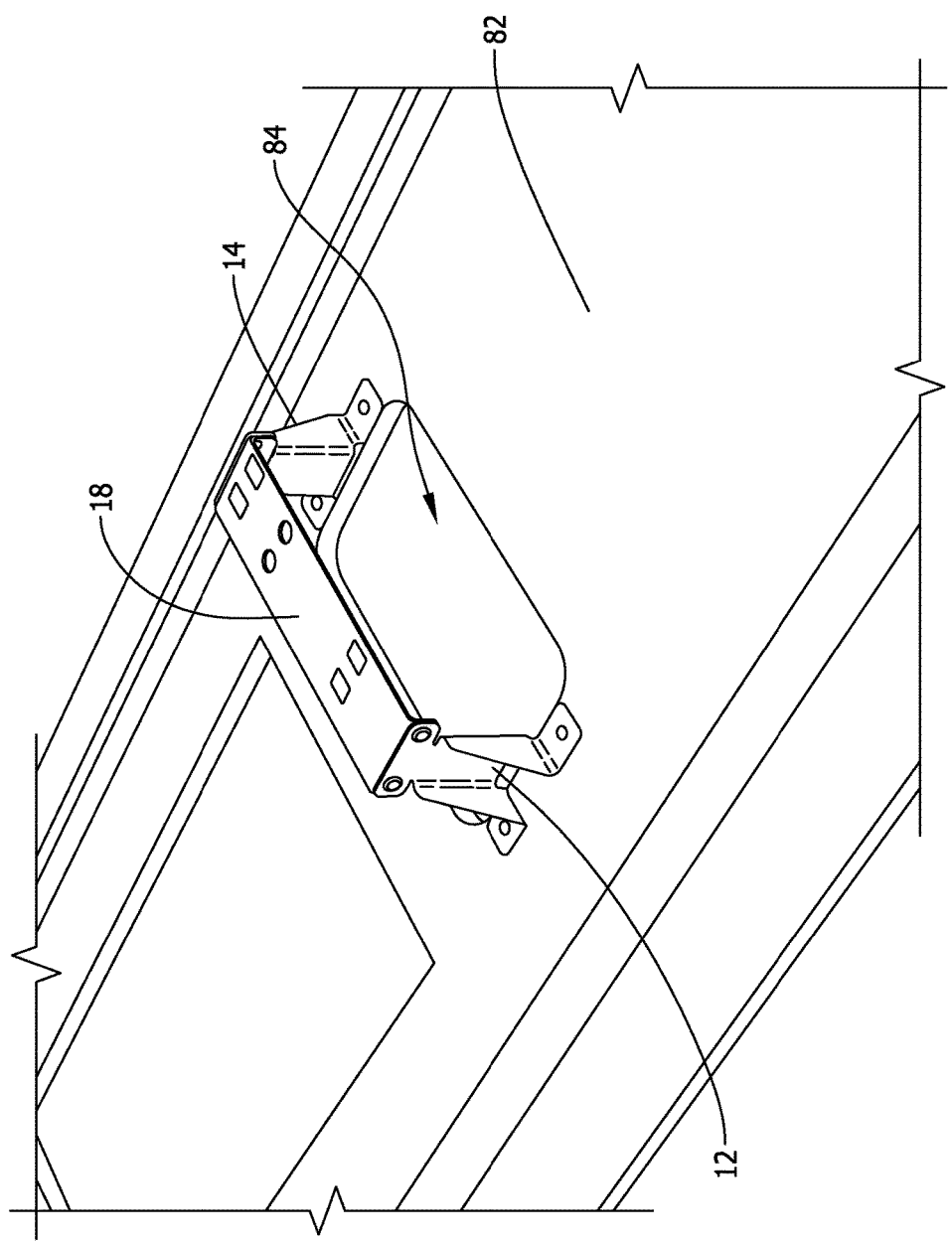
FIG. 16 is a representation of the ceiling panel of the aircraft cabin with the oxygen box removed.

FIG. 16 is a representation of the support structure 82 and the oxygen box hole 84 after the oxygen box 22 has been removed. The first support leg 12 and the second support leg 14 still support the exterior bracket 18 in its position above and across the oxygen box hole 84. Thus, the exterior bracket 18 is still in position for reattachment of the oxygen box 22 to the exterior bracket 18 from the interior of the aircraft cabin once servicing is complete. The oxygen box 22 is reattached to the exterior bracket 18 by reversing the steps for removing the oxygen box 22.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

What is claimed:

1. An oxygen box assembly comprising:
an oxygen box having an interior volume and a back wall and a front opening on opposite sides of the interior volume, the front opening of the oxygen box providing access to the interior volume of the oxygen box with the interior volume of the oxygen box being between the back wall of the oxygen box and the front opening of the oxygen box, the back wall having holes through the back wall, the oxygen box being configured to be inserted through an oxygen box hole through a panel of an aircraft cabin into a space behind the panel of the aircraft cabin and positioned flush with the panel of the aircraft cabin;
an exterior bracket that is configured to be attached to a support structure of an aircraft behind the panel of the aircraft cabin, the exterior bracket having fastener openings that are each configured to receive and hold a fastener, the fastener openings of the exterior bracket aligning with the holes through the back wall of the oxygen box with the oxygen box inserted through the oxygen box hole through the panel of the aircraft cabin;
at least one oxygen mask in the interior volume of the oxygen box; and,
fasteners inserted through the interior volume of the oxygen box, through the holes through the back wall of the oxygen box and into the fastener openings of the exterior bracket, the fasteners securing the back wall of the oxygen box and the exterior bracket together and thereby securing the oxygen box in the oxygen box hole through the panel of the aircraft cabin.

2. The oxygen box assembly claim 1, further comprising:
the panel of the aircraft cabin being a ceiling panel of the aircraft cabin.

3. The oxygen box assembly of claim 2, further comprising:
the exterior bracket being attached to the support structure of the aircraft with the exterior bracket extending over the oxygen box hole through the ceiling panel of the aircraft cabin.

4. The oxygen box assembly of claim 3, further comprising:
the exterior bracket having a length with a first end and a second end at opposite ends of the length of the exterior bracket, the fastener openings in the exterior bracket being positioned between the first end and the second end of the length of the exterior bracket;
a first support leg having a length with a bottom end and a top end at opposite ends of the length of the first support leg, the top end of the first support leg is attached to the first end of the exterior bracket and the bottom end of the first support leg is configured to be attached to the support structure of the aircraft whereby the first support leg supports the exterior bracket over the oxygen box hole through the ceiling panel of the aircraft cabin; and,
a second support leg having a length with a bottom end and a top end at opposite ends of the length of the second support leg, the top end of the second support leg is attached to the second end of the exterior bracket and the bottom end of the second support leg being configured to be attached to the support structure of the aircraft whereby the second support leg supports the exterior bracket over the oxygen box hole through the ceiling panel of the aircraft cabin.

5. The oxygen box assembly of claim 4, further comprising:
an interior bracket having holes through the interior bracket, the interior bracket being positioned inside the interior volume of the oxygen box and against the back wall of the oxygen box with the holes through the interior bracket aligned with the holes through the back wall of the oxygen box and aligned with the fastener openings of the exterior bracket; and,
the fasteners extending through the holes of the interior bracket, through the holes through the back wall of the oxygen box and into the fastener openings in the exterior bracket, the fasteners securing the interior bracket, the back wall of the oxygen box and the exterior bracket together and thereby removably securing the oxygen box in the oxygen box hole through the ceiling panel of the aircraft cabin.

6. The oxygen box assembly of claim 5, further comprising:
the fasteners being removable from the holes through the interior bracket, the holes through the back wall of the oxygen box and the fastener openings in the exterior bracket from the interior volume of the oxygen box to detach the oxygen box from the exterior bracket and from the support structure of the aircraft.

7. The oxygen box assembly of claim 1, further comprising:
the fasteners are screw threaded fasteners having heads with tool interface surfaces and screw threaded shafts, the screw threaded shafts of the fasteners extend through the holes through the back wall of the oxygen box and into the fastener openings in the exterior bracket in securing the back wall of the oxygen box and the exterior bracket together with the heads of the fasteners positioned in the interior volume of the oxygen box.

8. An oxygen box assembly comprising:
a first support leg having a length with a bottom end and a top end at opposite ends of the length of the first support leg, the bottom end of the first support leg being configured for attachment to a support structure of an aircraft adjacent an oxygen box hole through a panel of a cabin of the aircraft;
a second support leg having a length with a bottom end and a top end at opposite ends of the length of the second support leg, the bottom end of the second support leg being configured for attachment to a support structure of the aircraft adjacent the oxygen box hole through the panel of the cabin of the aircraft;
an exterior bracket having a length with a first end and second end at opposite ends of the length of the exterior bracket, the exterior bracket having fastener openings that are configured to receive and hold fasteners, the first end of the exterior bracket is attached to the top end of the first support leg and the second end of the exterior bracket is attached to the top end of the second support leg with the length of the exterior bracket extending over and across the oxygen box hole through the panel of the cabin of the aircraft;

an oxygen box configured to be inserted through the oxygen box hole in the panel of the aircraft into a space behind the panel of the aircraft and positioned flush with the panel of the aircraft, the oxygen box having an interior volume, the oxygen box having a back wall and a front opening at opposite sides of the interior volume of the oxygen box with the interior volume of the oxygen box being between the back wall of the oxygen box and the front opening of the oxygen box, the back wall having holes through the back wall, the back wall being positioned against the exterior bracket and the holes through the back wall aligning with the fastener openings of the exterior bracket;

at least one oxygen mask in the interior volume of the oxygen box;

an interior bracket having holes through the interior bracket, the interior bracket being positioned inside the interior volume of the oxygen box and against the back wall of the oxygen box with the holes through the interior bracket aligned with the holes through the back wall of the oxygen box and aligned with the fastener openings of the exterior bracket; and, fasteners through the holes through the interior bracket, through the holes through the back wall of the oxygen box and into the fastener openings in the exterior bracket, the fasteners securing the interior bracket, the back wall of the oxygen box and the exterior bracket together and thereby securing the oxygen box in the oxygen box hole through the panel of the aircraft cabin.

9. The oxygen box assembly of claim 8, further comprising:

the panel of the aircraft cabin being a ceiling panel of the aircraft cabin.

10. The oxygen box assembly of claim 8, further comprising:

the fasteners being removable from the holes through the interior bracket, the holes through the back wall of the oxygen box and the fastener openings in the exterior bracket from the interior volume of the oxygen box to detach the oxygen box from the exterior bracket and from the support structure of the aircraft.

11. The oxygen box assembly of claim 8, further comprising:

the fasteners are screw threaded fasteners having heads with tool interface surfaces and screw threaded shafts, the screw threaded shafts of the fasteners extend through the holes through the interior bracket, through the holes through the back wall of the oxygen box and into the fastener openings in the exterior bracket in securing the interior bracket, the back wall of the oxygen box and the exterior bracket together with the heads of the fasteners positioned in the interior volume of the oxygen box.

12. A method of removably attaching an oxygen box to a panel of an aircraft cabin, the method comprising:

attaching an exterior bracket to a support structure behind the panel of the aircraft cabin with the exterior bracket extending over an oxygen box hole in the panel of the aircraft cabin, the exterior bracket having fastener openings that are each configured to receive and hold a fastener;

positioning an oxygen box in the oxygen box hole through the panel of the aircraft cabin and into a space behind the panel of the aircraft cabin and positioning the oxygen box flush with the panel of the aircraft cabin, the oxygen box having an interior volume and a back wall and front opening at opposite sides of the interior volume with the interior volume of the oxygen box being between the back wall of the oxygen box and the front opening of the oxygen box, the back wall having holes through the back wall, aligning the holes through the back wall of the oxygen box with the fastener openings of the exterior bracket; and, inserting fasteners through the interior volume of the oxygen box, through the holes through the back wall of the oxygen box and into the fastener openings of the exterior bracket and securing the back wall of the oxygen box and the exterior bracket together with the fasteners thereby removably attaching the oxygen box in the oxygen box hole through the panel of the aircraft cabin.

13. The method of claim 12, further comprising:

opening a door of the oxygen box and deploying a facemask from the interior volume of the oxygen box prior to inserting the fasteners through the interior volume of the oxygen box and through the holes through the back wall of the oxygen box and into the fastener openings of the exterior bracket.

14. The method of claim 12, further comprising:

positioning the oxygen box in the oxygen box hole through the panel of the aircraft cabin where the panel is a ceiling panel.

15. The method of claim 12, further comprising:

inserting an interior bracket having fastener holes into the interior volume of the oxygen box;

positioning the interior bracket against the back wall of the oxygen box with the fastener holes in the interior bracket aligned with holes through the back wall of the oxygen box and aligned with the fastener openings of the exterior bracket; and, inserting fasteners through the interior volume of the oxygen box, through the fastener holes through the interior bracket, through the holes through the back wall of the oxygen box and into the fastener openings of the exterior bracket.

16. The method of claim 12, further comprising:

inserting an interior bracket having fastener holes into the interior volume of the oxygen box;

positioning the interior bracket against the back wall of the oxygen box; and, attaching the interior bracket to the back wall of the oxygen box to reinforce the back wall of the oxygen box.

17. The method of claim 16, further comprising:

aligning fastener holes through the interior bracket with the holes through the back wall of the oxygen box prior to attaching the interior bracket to the back wall of the oxygen box.

18. The method of claim 17, further comprising:

aligning the holes through the interior bracket with the holes through the back wall of the oxygen box and with the fastener openings of the exterior bracket prior to securing the back wall of the oxygen box and the exterior bracket together.

19. The method of claim 12, further comprising:

removing the oxygen box from the exterior bracket and from the oxygen box hole through the panel by removing the fasteners from the interior volume of the oxygen box.

20. The method of claim 19, further comprising:
opening a door of the oxygen box and deploying a facemask from the interior volume of the oxygen box prior to removing the fasteners from the interior volume of the oxygen box.

* * * * *